US00RE34489E

United States Patent [19]

Hansma et al.

[11] E Patent Number: Re. 34,489

[45] Reissued Date of Patent: Dec. 28, 1993

[54] ATOMIC FORCE MICROSCOPE WITH OPTIONAL REPLACEABLE FLUID CELL

[75] Inventors: Paul K. Hansma; Barney Drake, both of Santa Barbara, Calif.

[73] Assignee: The Regents of the University of California, Berkeley, Calif.

[21] Appl. No.: 895,984

[22] Filed: Jun. 4, 1992

Related U.S. Patent Documents

Reissue of:

[64] Patent No.: 4,935,634
Issued: Jun. 19, 1990
Appl. No.: 3,22,,001
Filed: Mar. 13, 1989

[51] Int. Cl.[5] ..... G01N 21/86

[52] U.S. Cl. ..... 250/560; 250/306

[58] Field of Search ..... 250/560, 561, 216, 306, 250/307, 423 F

[56] References Cited

U.S. PATENT DOCUMENTS 4,823,004 4/1989 Kaiser et al. ..... 250/306

OTHER PUBLICATIONS

Applied Physics Letters, vol. 55, No. 24, Dec. 11, 1989, New York, pp. 2491–2493; S. A. Chalmers et al.; "Determination of Tilted Superlattice Structure by Atomic Force Microscopy".

Applied Physics Letters, vol. 50, No. 24, Jun. 15, 1987, New York, pp. 1742–1744; R. Sonnenfeld et al.; "Semiconductor Topography in Aqueous Environments: Tunneling Microscopy of Chemomechanically Polished (001) GaAs.

Review of Scientific Instruments, vol. 59, No. 6, Jun. 1, 1988, New York, pp. 833–835; M. D. Kirk et al.; "Low-Temperature Force Microscopy".

Applied Physics Letters, vol. 51, No. 7, Aug. 17, 1987, New York, pp. 484–486; O. Marti et al.; "Atomic Force Microscopy of Liquid-Covered Surfaces: Atomic Resolution Image".

Journal of Vacuum Science and Technology: Part A, vol. 6, No. 2, Mar. 1, 1988, New York, pp. 380–382; P. Davidsson et al.; "A New Symmetric Scanning Tunneling Microscope Design".

"Atomic-Resolution Microscopy in Water"; Richard Sonnenfeld et al., Apr. 11, 1986, vol. 232, pp. 211–213.

*Primary Examiner*—David C. Nelms

*Attorney, Agent, or Firm*—Oblon, Spivak, McClelland, Maier & Neustadt

[57] ABSTRACT

An atomic force microscope which is readily useable for researchers for its intended use without extensive lost time for setup and repair. The probe used therein is a cantilevered optical lever which imparts surface information in a gentle and reliable manner by reflecting an incident laser beam. The probe is carried by a replaceable probe-carrying module which is factory set up and merely inserted and fine tuned by the user. The probe-carrying module also includes the provision for forming a fluid cell around the probe. Fluid can be inserted into and/or be circulated through the fluid cell through incorporated tubes in the porbe-carrying module. Electrodes are also provided in the fluid cell for various uses including real-time studies of electro-chemical operations taking place in the fluid cell. The piezoelectric scan tube employed includes a voltage shield to prevent scanning voltages to the tube from affecting data readings. Samples are easily mounted, replaced, and horizontally adjusted using a sample stage which is magnetically attached to the top of the scan tube. Calibration tools are provided to make initial set up and fine tuning of the microscope a simple and straightforward operation requiring little or no technical talent.

139 Claims, 6 Drawing Sheets

ATOMIC FORCE MICROSCOPE WITH OPTIONAL REPLACEABLE FLUID CELL

Matter enclosed in heavy brackets [ ] appears in the original patent but forms no part of this reissue specification; matter printed in italics indicates the additions made by reissue.

This invention was made with Government support under Contract No. N00014-87-K-2058 awarded by the Office of Naval Research. The Government has certain rights in this invention.

BACKGROUND OF THE INVENTION:

This invention relates to scanning microscopes used for imaging the topography of surfaces and, more particularly, to an atomic force microscope having extended use capabilities comprising, a horizontal base member; a scan tube vertically supported at a bottom end by the base member and having a top surface for holding a sample to be scanned and moveable in x-, y-, and z-directions as a result of scanning voltages applied thereto; first support means extending upward from the base member; a sample holding block having a chamber therein, the sample holding block having a first bore communicating with the chamber through a bottom surface, a second bore communicating with the chamber through a top surface, and a third bore communicating with the chamber at an acute angle to the second bore, the sample holding block being positioned with the scan tube passing through the first bore and supported by the first support means; second support means extending upward from the bottom surface into the chamber, a probe-carrying module having a probe attached thereto and extending downward therefrom at an acute angle with a tip of the probe positioned to contact a sample mounted on the top surface of the scan tube, the probe carried by the probe-carrying module comprising a substrate attached to the probe-carrying module and a pair of arms of a smooth-surfaced, minimally self-biased material cantilevered outward from a bottom front edge of the substrate in a V-shape to form an optical lever, the pair of arms having a probe point at the apex of the V-shape thereof; a source of a laser beam mounted for directing the laser beam down the second bore from the top surface of the sample holding block to strike the probe and be reflected down the third bore to an outer end thereof; and, photoelectric sensor means having an active surface positioned over the outer end of the third bore for developing an electrical signal at an output thereof reflecting the position on the active surface at which the laser beam strikes the active surface.

The family of scanning probe microscopes that have been introduced to the scientific community of recent years is broadening the frontiers of microscopy. As typified by the greatly simplified general example of FIGS. 1 and 2, these microscopes scan a sharp probe 10 over the surface 12 of a sample 14 to obtain surface contours, in some cases actually down to the atomic scale. The probe 10 may be affixed to a scanning mechanism and moved in a scan pattern over the surface 12 or alternately (and equally effectively because of the small sizes involved) the probe 10 may be stationary with the sample 14 mounted on a scanning mechanism that moves the surface 12 across the probe 10 in a scanning pattern. The tip 16 of the probe 10 rides over the surface 12 as the probe 10 is moved across it. As the tip 16 follows the topography of the surface 12, the probe 10 moves up and down as indicated by the bi-directional arrow 18. This up and down movement of the probe 10 is sensed to develop a signal which is indicative of the z directional component of the 3-dimensional surface 12.

Early atomic force microscopes (AFMs) mounted the probe 10 to a wire and electrically sensed the movement of the wire as the probe tip 16 moved over the surface 12. Recent prior art AFMs employ technology developed in the microelectronics art as depicted in FIG. 1. It should be noted that the drawings figures herein are not to scale as the probe 10 and its tip 16 (typically of a diamond material) are extremely small so as to be useful at the near-atomic level. If the drawings were drawn to scale, these components would not be visible. In fact, when working with AFMs, these components are not visible to the naked eye and must be viewed with an optical microscope. As will be seen shortly, this is a source of some of the problems which are solved by this invention.

As depicted in FIG. 1, recent prior art AFMs have the probe 10 extending outward from the forward edge of a substrate 20 with the probe 10 being formed thereat by manufacturing techniques which are not critical to the present invention. It is sufficient to point out that the probe 10 is typically in the form of an arm extending outward from the substrate 20 with the diamond tip 16 attached at the end of the arm. Also, the probe 10 is extremely small and extremely fragile. The substrate 20 is typically adhesively attached to the bottom and extending outward from the forward edge of a large steel block 22 mounted to the surrounding structure. Where the probe 10 and sample 14 are conductive, the position of the probe 10 as a result of the deflection caused by the surface 12 during the scanning process can be sensed electrically. Where non-conductive samples are to be scanned, the prior art literature suggests bouncing a laser beam 24 off the probe 10 to be sensed by a photoelectric sensor 26. As depicted in FIG. 2, as the probe 10 deflects up and down, the reflection angle of the laser beam 24 is changed. It is this change in reflection angle that is sensed by the photoelectric sensor 26, which then outputs an electrical signal related to the angle (by way of the beam of light striking a detecting surface), and thereby the z directional component of the probe 10.

Regardless of the probe positional sensing method employing (electrical or laser light), there are a number of problems associated with the prior art AFMs as typified by the simplified drawings of FIGS. 1 and 2. As depicted in FIG. 2, the surface 12 of a sample 14 has a thin (i.e. molecular level) coating of water 28 thereon. Often, the small, lightweight tip 16 of the probe 10 is "sucked" into the surface 12 against the miniscule resilient biasing force of the probe 10 by the capillary action of this coating of water 28. This, of course, can seriously damage the tip 16 to the point of making it non-useful for its intended purpose. Further on the negative side, the coating of water 28 is not sufficient to provide any lubricating with respect to the tip 16 sliding over the surface 12. As a result, frictional wear of the tip 16 is a serious problem causing the tip 16 to wear off quickly to the point of making it non-useful of its intended purpose. Also, with some sample materials the tip 16 may dig into and damage the sample surface 12 rather than sliding over it to provide useful information. Additionally, the scanning action is accomplished by the application of fairly high voltages to a scanning member. With the steel mounting block 22 in close proximity as depicted in FIG. 1, these voltages can be attracted to the steel block 22 and, in the process, affect the probe 10 thereby introducing false data into the output stream.

The type of environment and class of persons who are and will be using AFMs in the future also adds to the problems of this extremely useful and potentially powerful device. Typically, the user is a researcher working on various projects in a laboratory environment. He/she is not interested in having to "play" with the AFM to get it to produce workable results. In its present configuration as depicted by the drawings of FIGS. 1 and 2, it is difficult of set up for scanning. It is easy to break the tip 16 from the probe 10 and/or the probe 10 from the substrate 20. Replacing the probe/tip assembly is a major undertaking; and, because of the problems described above, the life expectancy of the probe/tip is extremely short. Moreover, the sample 14 is glued to the top of a piezoelectric scanning tube (not shown in FIGS. 1 or 2) which provides the scanning action by moving the sample with respect to the stationary probe 10 (which must remain fixed in position to have the laser beam 24 reflect from it for detection purposes). Thus, once placed, the sample 14 is impossible to move (so as to change the scanning point) and difficult to change. Positioning the tip 16 of the probe 10 on the surface 12 of the sample 14 is difficult at best and virtually impossible in some cases. In short, while AFMs are moving into a commercial stage of development, the products which are available in the prior art are not the efficient, easy to use laboratory aids that the users thereof desire and need.

Wherefore, it is an object of the present invention to provide an AFM system which is easy to set up, calibrate, and use in the typical laboratory environment by the typical laboratory worker.

It is another object of the present invention to provide an AFM system in which the probe/tip resist frictional wear.

It is still another object of the present invention to provide an AFM system in which the probe/tip are not subjected to the capillary forces of water coating the surface of the sample.

It is yet another object of the present [inventio] *invention* to provide an AFM system in which the probe/tip slide easily over the sample surface and resist digging into softer samples and damaging them thereby providing a gentler and more reliable operation.

It is a further object of the present invention to provide an AFM system in which the probe/tip are contained in an easily replaceable module which is recyclable by the AFM supplier.

It is a still further object of the present invention to provide an AFM system having calibration/setup tools included therewith which make the setting up of the AFM a simple and straightforward task.

It is another object of the present invention to provide an AFM system in which the sample is held by a removeable and adjustable member which allows the position of the sample to be changed in situ and allows a new sample to be installed easily and quickly without destruction of previous samples.

It is also an object of the present invention to provide an AFM system in which the steel mounting block of the prior art is removed without affecting the stability of the probe and tip.

Other objects and benefits of this invention will become apparent from the description which follows hereinafter when taken in conjunction with the drawing figures which accompany it.

SUMMARY

The foregoing objects have been achieved in the atomic force microscope of the present invention which is quickly and easily set up and in which the probe thereof is easily replaceable and resists breakage during setup comprising, a horizontal base member; a scan tube vertically supported at a bottom end by the base member and having a top surface for holding a sample to be scanned and moveable in x-, y-, and z-directions as a result of scanning voltages applied thereto; first support means extending upward from the base member; a sample holding block having a chamber therein; the sample holding block having a first bore communicating with the chamber through a bottom surface, a second bore communicating with the chamber through a top surface, and a third bore communicating with the chamber at an acute angle to the second bore, the sample holding block being positioned with the scan tube passing through the first bore and supported by the first support means; second support means extending upward from the bottom surface into the chamber; a probe-carrying module having parallel top and bottom surfaces removably disposed in the chamber and supported by the second support means, the bottom surface having a probe attached thereto and extending downward therefrom at an acute angle with respect to the bottom surface of the probe-carrying module and with a tip of the probe positioned to contact a sample mounted on the top surface of the scan tube; a source of a laser beam mounted for directing the laser beam down the second bore from the top surface of the sample holding block to pass through the probe-carrying module, strike the probe, and be reflected back through the probe-carrying module and down the third bore to an outer end thereof; and, photoelectric sensor means having an active surface positioned over the outer end of the third bore for developing an electrical signal at an output thereof reflecting the position on the active surface at which the laser beam strikes the active surface.

In one embodiment, the probe-carrying module is of an optically transparent material whereby the laser beam can pass through the probe-carrying module, strike the probe, and be reflected back through the probe-carrying module. In another embodiment, the probe-carrying module is of an optically non-transparent material and has a laser-passing bore therethrough between the top and bottom surfaces aligned so that the laser beam can pass through the laser-passing bore, strike the probe, and be reflected back through the laser-passing bore.

In the preferred embodiment, the probe-carrying module includes an angled pad on the bottom surface thereof and the probe carried by the probe-carrying module comprises a substrate attached to the pad and a pair of arms of a smooth-surfaced, minimally self-biased material cantilevered outward from a bottom front edge of the substrate in a V-shape to form an optical lever, the pair of arms having a probe point at the apex of the V-shape thereof.

In the preferred embodiment, the first support means comprises three first adjusting screws threaded through the base member with the sample holding block resting on top ends thereof with one of the top ends disposed in a slot in a flat bottom surface of the sample holding back, another of the top ends disposed in a hole in the bottom surface, and a third of the top ends disposed on the bottom surface whereby the sample holding block is removable from the base member and repeatedly replaceable to a pre-established position thereon. Additionally, the second support means comprises three second adjusting screws threaded through the bottom surface of the sample holding block with the probe-carrying module resting on top ends thereof with one of the top ends disposed in a slot in a flat bottom surface of the probe-carrying module, another of the top ends disposed in a hole in a member affixed to the bottom surface, and a third of the top ends disposed on the bottom surface whereby the probe-carrying module is removable from the chamber of the sample holding block and repeatedly replaceable to a pre-established position therein.

The preferred fluid cell is [prvivded] *provided* by the probe-carrying module being of an optically transparent material and additional sealing means surrounding the probe and attached to the bottom surface of the probe-carrying module or sealing to a top surface of a sample to form a fluid cell around the probe. The preferred fluid cell includes an inlet bore and an outlet bore in the probe-carrying module communicating between the fluid cell and the exterior of the probe-carrying module whereby fluid can be inserted into the fluid cell.

Preferably, there is an electrode bore in the probe-carrying module communicating between the fluid cell and the exterior of the probe-carrying module and an electrode disposed in the electrode bore having a first end within the fluid cell and a second end at the exterior of the probe-carrying module to which electrical connection can be made. For electro-chemical use, there are three electrode bores in the probe-carrying module communicating between the fluid cell and the exterior of the probe-carrying module as well as a working electrode, a reference electrode, and an auxiliary electrode disposed in the electrode bores, each of the electrodes having a first end within the fluid cell and a second end at the exterior of the probe-carrying module to which electrical connection can be made.

Preferred operation is achieved by including a voltage shield of an electrically conductive material disposed over the top surface of the scan tube in non-electrical contact therewith, the voltage shield being electrically connected to a fixed voltage source whereby to shield the probe from the effects of the scanning voltages applied to the scan tube.

To provide ease of sample placement, replacement, and lateral adjustment, there is a slidably moveable and removeable stage releasably attached to the top surface of the scan tube for releasably and adjustably holding a sample to be scanned attached thereto. In one embodiment, the stage contains a magnet therein and the voltage shield is of a ferro-magnetic material to which the stage can magnetically attach and upon which it can slide. In another embodiment, the stage is of a ferro-magnetic material and the voltage shield contains the magnet therein.

The preferred system includes various calibration means to make a user's job one of microscope use and not one of detailed setup and maintenance. In particular, there are first calibration means for positioning the member affixed to the bottom surface of the probe-carrying module as a function of the position of a tip portion of the probe; second calibration means for setting the position of the sample holding block on the first support means; and, third calibration means for setting the position of the probe-carrying module on the second support means.

Figures 1, 2, 3:
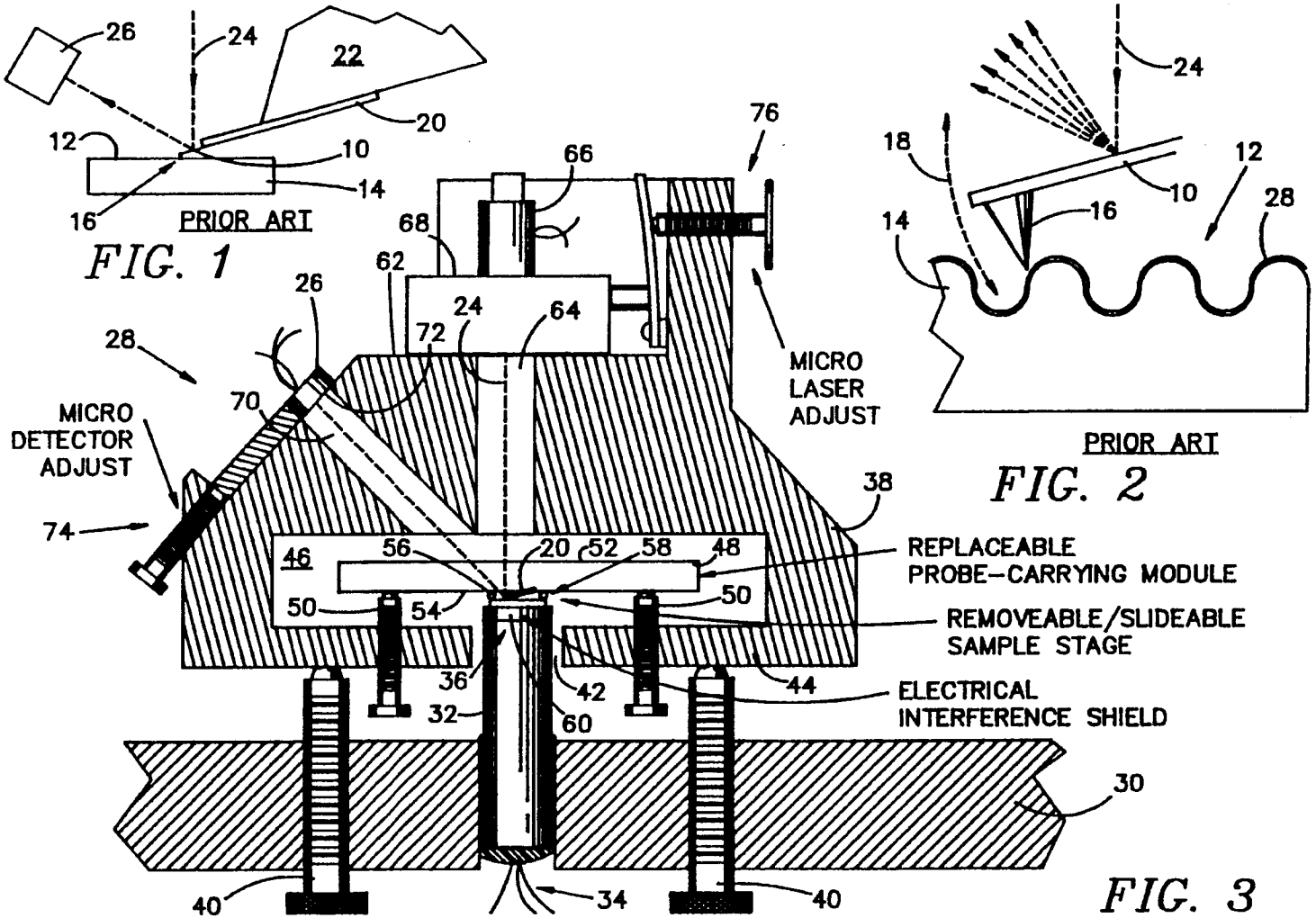
FIG. 1 is a simplified drawing of a prior art atomic force microscope showing the probe as mounted to a substrate carried by a large steel block being detected by a laser beam being reflected therefrom.
FIG. 2 is an enlarged drawing of the tip of the probe of FIG. 1 showing the movement of the tip over the surface of a sample and how the reflection angle of the laser beam is changed as a result of deflection of the probe.
FIG. 3 is a partially cutaway side view of an atomic force microscope according to the present invention.

DESCRIPTION OF THE PREFERRED EMBODIMENT:

The essential elements of an AFM 28 according to the present invention in its preferred embodiment are depicted in the cutaway side view of FIG. 3. There is a base 30 which, as in the typical prior art AFM, is shock mounted in some manner. A piezoelectric scan tube 32 is mounted extending perpendicularly upward from the base 30. The scan tube 32 is of a conventional design well known in the art whereby by the application of [z-] x-, y-, and z-directional scan voltages to the wires 34, the top end 36 of the tube 32 can be moved horizontally in two orthogonal directions and vertically to provide x and y scanning as well as fine probe positioning in the z direction to the atomic level.

A sample-holding block 38 is supported on the tips of three adjusting screws 40 threaded through the base 30 employing a hole/slot/surface contact and alignment technique which is well known in the art, to be addressed in greater detail later herein. As can be seen, the scan tube 32 extends through a bore 42 in the bottom 44 of the sample-holding block 38 so that the top end 36 thereof is within a chamber 46 within the sample-holding block 38. A probe-carrying module 48 is disposed within the chamber 46 and supported on the tips of three adjusting screws 50 threaded through the bottom 44 employing a special application of the above-mentioned hole/slot/surface contact and alignment technique, which will also be addressed in greater detail later herein. The probe-carrying [moduel] *module* 48, as will be seen shortly, provides the solution to several major problems of prior art AFMs as described above. The probe-carrying module 48 is of a transparent material having parallel, planar top and bottom surfaces, 52, 54, respectively. In order of preference, the probe-carrying module 48 can be made of quartz, glass, or a plastic such as polycarbonate. The substrate 20 having the probe 10 mounted thereto is glued to the bottom surface 54 within an O-ring 56 also glued to the bottom surface 54. As will be described in further detail shortly, this arrangement can be employed to place the probe 10 within a fluid cell which can exist between the bottom surface 54 and the sample 14 within the O-ring 56. That, of course, eliminates the capillary attraction problem described above and provides a low friction/lubricating environment wherein even soft tissue samples, and the like, can be scanned without damage thereto. As will be noted, the steel block 22 of the prior art has been eliminated, as desired. The probe tip 16 is automatically aligned with respect to the laser beam 24 in a manner to be described shortly. Perhaps most important, the probe-carrying module 48 can be removed and replaced quickly, accurately, and easily if and when the probe/-tip become broken and/or worn. The used module 48 can then be returned to the factory for the installation of a new probe 10 under the proper conditions. The sample 14 is attached to the top of a removable sample stage 58. Thus, a particular sample 14 can be attached easily to the stage 58 at a bench location away from the AFM 28. If desired, a particular sample can be removed temporarily and then be reinserted at a later time. Additionally, the sample stage 58 is magnetically attached to a ferromagnetic electrical interference shield 60 carried by the top end 36 of the scan tube 32. The shield 60 prevents electrical interference from the scan voltages applied to the tube 32 and, additionally, the magnetic attachment of the sample stage 58 thereto permits the stage 58 (and attached sample 14) to be slid horizontally in the x and y directions to place the desired area for scanning under the probe tip 16.

The top of the sample holding block 38 has a flat stage area 62 thereon which is parallel to the bottom 44. A bore 64 extends perpendicularly from the stage area 62 into the chamber 46 generally concentrically about a point on the probe-carrying module 48 where the tip 16 of the probe 10 is to be located. A laser beam source 66 is carried by a rectangular holding member 68 magnetically attached to the stage area 62 for horizontal sliding movement thereon. The laser beam 24 from the source 66, therefore, shines down the bore 64 to strike the probe 10 from whence it is angularly reflected up bore 70 to strike the detecting surface 72 of a photoelectric sensor 26 (of a type well known in the art which individually forms no part of the novelty of this invention). The sensor 26 is adjustably held in a micro detector adjustor 74. In presently tested embodiments of this invention, the source 66 of the laser beam 24 is a holder gripping one end of an optic fiber which has the laser beam 24 from a commercial laser device input thereto at the opposite end to prevent heat buildup from the laser device in the area of the probe 10 and associated apparatus. A preferred source 66 would include a laser-emitting diode located within the source 66 itself. The horizontal position of the holding member 68 is fine-adjusted in the x and y directions (to place the laser beam 24 exactly on the probe 10 for optimum reflection) by means of a pair of orthogonally oriented micro laser adjustors 76. Having thus described the present invention and its various components and aspects in a general manner, the various point of novelty will now be addressed in greater detail.

Figure 4:
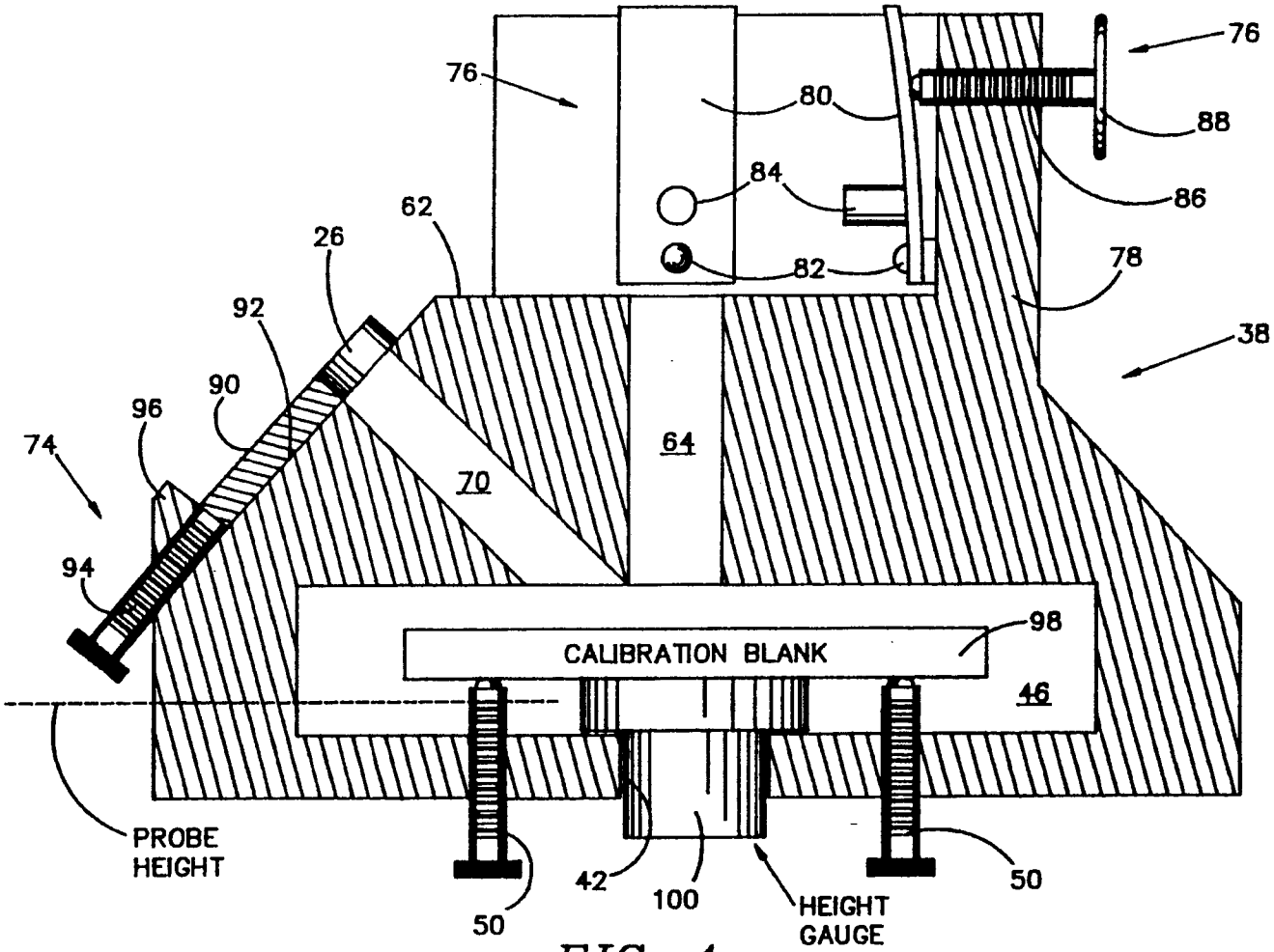
FIG. 4 is an enlarged cutaway side view of the sample-holding block of the atomic force microscope of FIG. 3 showing how the supporting screws thereof are calibrated to a proper height.

The sample holding block 38 and the method of setting the adjusting screws 50 is depicted in the enlarged drawing of FIG. 4. As can be seen from this figure, there are micro laser adjustors 76 oriented at 90° to one another. Each adjustor 76 comprises a vertical member 78 extending upward from the sample holding block 38 adjacent the stage area 62. A leaf spring member 80 extends upward along the inner surface of the vertical member 78 from a point of attachment thereto at 82. A magnetic probe 84 extends outward towards the stage area 62 from a point just above the point of attachment 82. An adjusting screw 86 is threaded through the vertical member 78 into contact with the leaf spring member 80 near the top of the vertical member 78. Note that the adjusting screws 86 have a large diameter turning wheel 88 on the outer end thereof whereby the adjusting screws 86 [cna] *can* be turned easily a fraction of a rotation when horizontally adjusting the position of the holding member 68 on the stage area 62. Note also that there is a large mechanical advantage from the positioning of the adjusting screw 86 on the leaf spring member 80 with respect to the magnetic probe 84 and the point of attachment 82. As a result, turning the wheel 88 (which can be accomplished easily and smoothly because of the mechanical advantages provided) will result in a very small horizontal movement of the holding member 68, which is desirable in order to be able to accurately accomplish the final positioning of the laser beam 24 on the probe 10.

Figure 14:
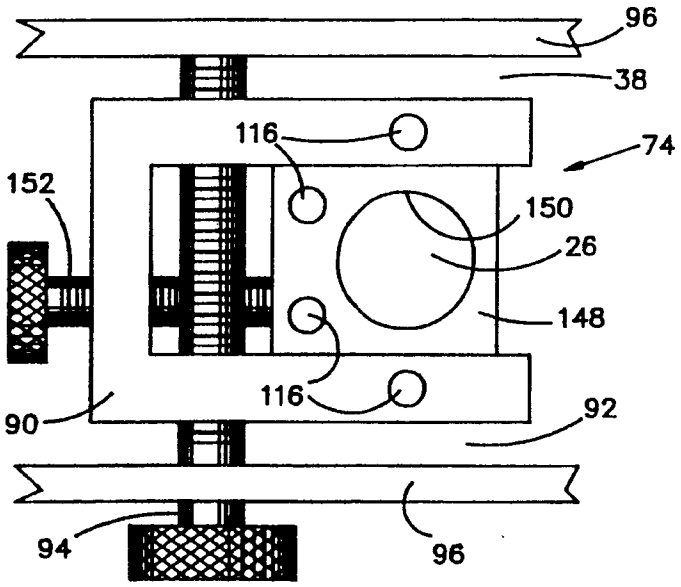
FIG. 14 is a detailed drawing of the preferred holding and adjusting mechanism for the photoelectric sensor employed in the present invention.

As depicted in detail in FIG. 14, the preferred micro detector adjustor 74 comprises a U-shaped slider member 90 magnetically adhering to the sliding surface 92 of the sample holding block 38, which is perpendicular to the bore 70. The sensor 26 is held within the sideward-facing U of the slider member 90 by a holder 148 having an area 150 therein sized to the contours of the sensor 26. Both the holder 148 and the slider member 90 are held to the sliding surface 92 by magnets 116. The slider member 90 is moved up and down by the adjusting screw 94 which is threaded through the slider member 90 between the webs 96 in the sample holding block 38 provided for the purpose. The holder 148 is moved sideways by the adjusting screw 152 threaded through the bottom of the U of the slider member 90.

The position of the adjusting screws 50 (and thereby the position of the probe-carrying module 48 when inserted into the chamber 46) can be set using a calibration blank 98 and height gauge 100 as shown. The height gauge 100 is inserted into the bore 42 and the calibration blank 98 is positioned on the adjusting screws 50. The screws 50 are then raised and/or lowered, as appropriate, until the calibration blank 98 is just resting evenly on the flat top surface of the height gauge 100. At that point, the screws 50 are set to a height such that when the probe-carrying module 48 is positioned on the screws, the probe tip 16 will be at the desired (and anticipated) probe height as shown.

Figure 5:
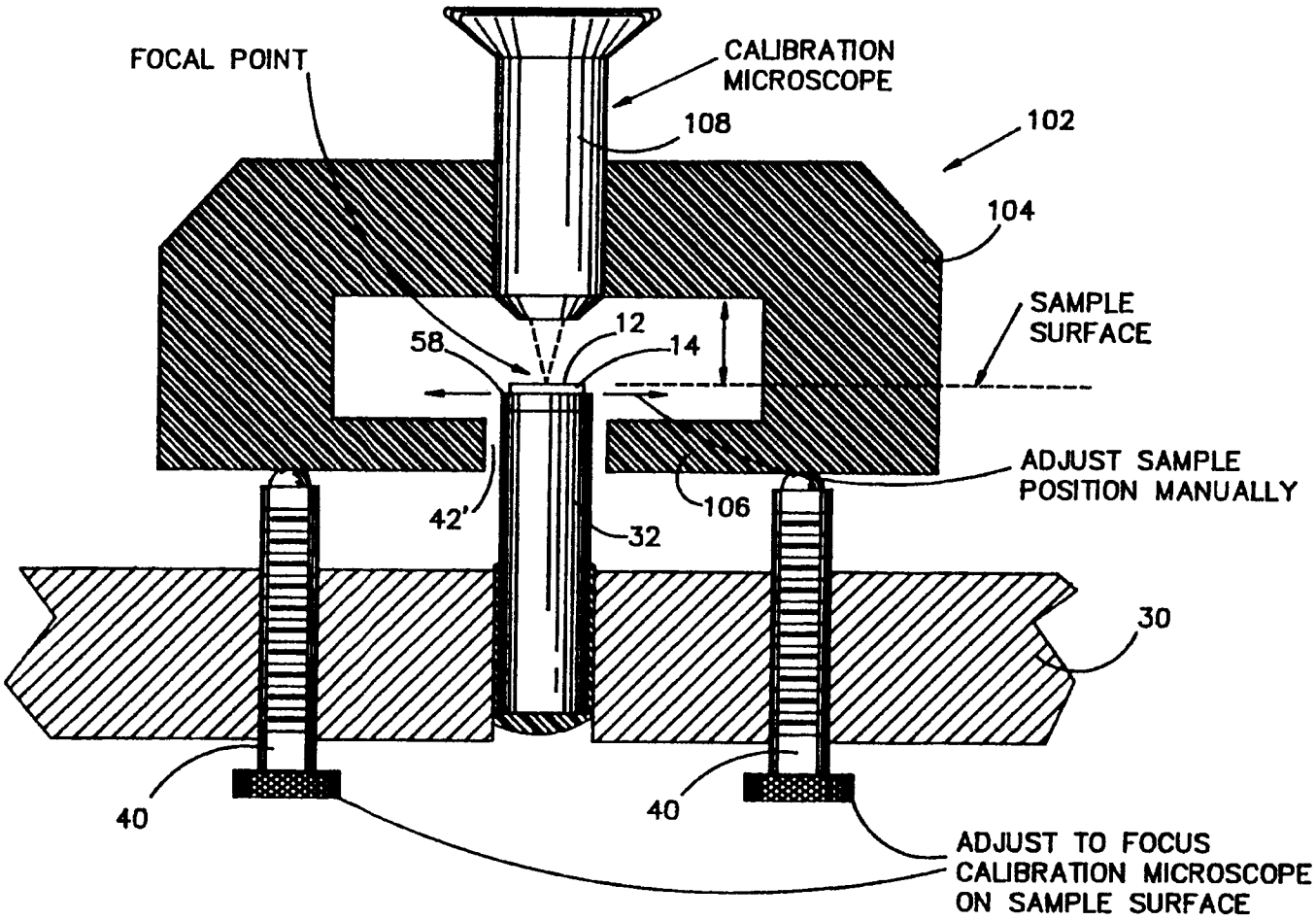
FIG. 5 is an enlarged cutaway side view of the sample-holding block of FIG. 4 mounted on the base portion of the atomic force microscope of FIG. 3 showing how the supporting screws thereof are calibrated to place the probe tip at a proper height.

The adjusting screws 40 must also be set to a proper height to support the probe-carrying module 48 at a point where the sample surface of a mounted sample to be scanned will be at the probe level anticipated by the calibration procedure just described with respect to FIG. 4. This is accomplished using the calibration tool 102 in the manner depicted in FIG. 5. Calibration tool 102 comprises a yoke 104 having a bottom 106 configured exactly like the bottom 44 of the sample holding block 38, including a bore 42' for the scan tube 32 to pass through. It should be noted that, as will be seen from a description contained hereinafter, while the adjusting screws 50 of the sample holding block 38 need be adjusted only rarely, the adjusting screws 40 will need to be adjusted whenever the sample 14 is changed. This is because the sample 14 is glued to the sample stage 58 and the height of the sample surface may change significantly from one sample to the next, at least in the sizes being considered in the operation of the AFM 28. The calibration tool 102 also has a short focal length calibration microscope 108 positioned perpendicularly to be above the sample surface 12 when the calibration tool 102 is mounted on the adjusting screws 40. The focal length of the calibration microscope 108 is chosen such as to focus exactly at the plane the probe tip 16 will be in. To properly adjust the adjusting screws 40, the sample 14 is mounted on the scan tube 20 and the calibration tool 102 positioned as shown in FIG. 5. While viewing through the calibration microscope 102, the adjusting screws 40 are used to move the calibration tool 102 up and down until the entire surface 12 of the sample 14 is in focus. At that point, the adjusting screws 40 are properly set. Because of the short focal length employed, the surface 12, when completely in focus, is also parallel to the scanning action of the probe 10.

Figure 13:
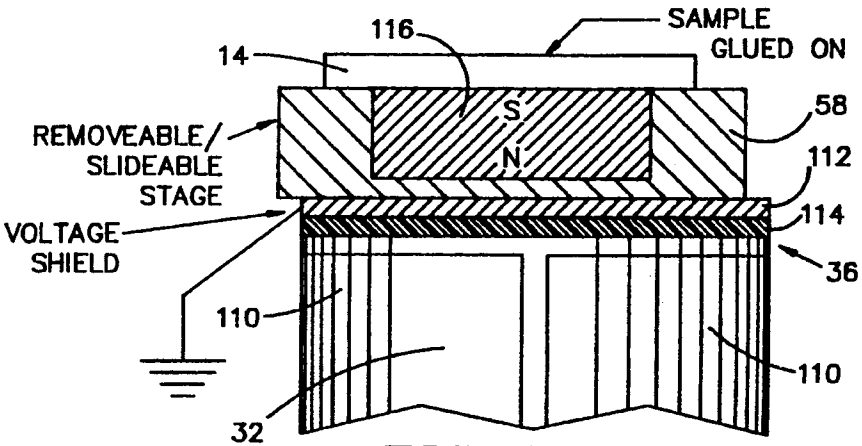
FIG. 13 is a partially cutaway side view of the top of a piezoelectric scanning tube employing the voltage shield and the removable/slideable stage of the present invention in a first embodiment.
Figure 15:
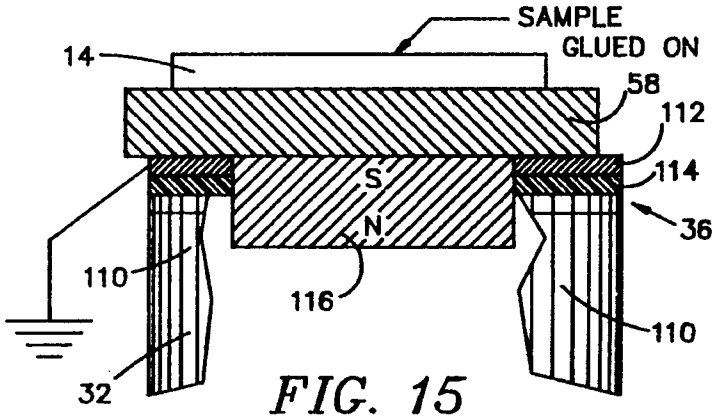
FIG. 15 is a partially cutaway side view of the top of a piezoelectric scanning tube employing the voltage shield and the removable/slideable stage of the present invention in an alternate embodiment.

Before continuing with the setup and calibration aspects of the present invention, attention is directed to FIGS. 13 and 15 which are directly related to the last described aspects of this invention. As mentioned earlier, the scanning movement of the piezoelectric scan tube 32 is affected by the application of voltages (which can be in the 100 volt range) to electrodes 110 on the exterior and interior surfaces of the tube 32, which is made of a piezoelectric material. Independently of the attracting potential of the steel block 22 (which has been removed in the preferred embodiment of this invention), the inventors herein have observed (and proved) that the scanning voltages employed to move the scan tube 32 can still adversely affect the probe 10. To solve this problem, a disk shaped voltage shield 112 is attached to the top end 36 of the tube 32. Since the shield 112 must be electrically conductive, it is attached to the top end 36 of the tube 32 with an insulating adhesive 114. The voltage shield 112 is then physically connected to a ground potential. Optionally, it can be connected to a fixed voltage potential which is available.

The adjustability and removability aspects of the sample stage 58 can be accomplished in two ways as depicted in FIGS. 13 and 15, respectively. In the embodiment of FIG. 13, the voltage shield 112 is of a ferromagnetic material and the sample stage 58 has a magnet 116 mounted therein. In the embodiment of FIG. 15, the voltage shield 112 has a magnet 116 mounted concentrically therein and the sample stage 58 is of a ferro-magnetic material. Accordingly, in either embodiment the voltage shield 112 not only shields against the effects of stray voltages reaching the probe 10; but, additionally, provides a surface on the top end 36 of the scan tube 32 onto which the removeable sample stage 58 having a sample 14 glued thereto can be magnetically attached. Accordingly, while the sample 14 is positioned on the tube 32 and as part of the adjustment of the adjusting screws 40 as described with respect to FIG. 5, the sample stage 58 can be slid horizontally in both the x and y directions to place an area of interest under the probe to be scanned thereby.

Figure 16:
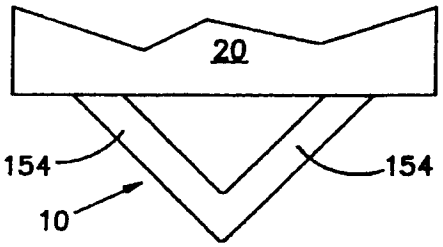
FIG. 16 is a top view of the preferred probe configuration of the present invention.
Figure 17:
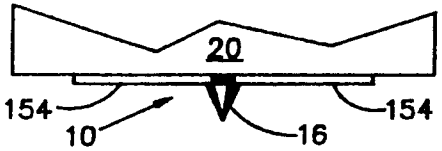
FIG. 17 is a front view of the probe of FIG. 16.

The problems of capillary action and friction in soft samples as well as the providing of the gentler and more reliable operation will now be addressed. An important aspect of the AFM 28 of this invention is the inclusion of a unique probe design which is, in fact, a microfabricated cantilever with an optical lever as shown in FIGS. 16 and 17. The probe 10 comprises a pair of V-shaped arms 154 formed on the bottom forward edge of the supporting substrate 20 by microfabrication techniques well known in the microelectronics art which, per se, form no part of this invention. The arms 154 are, therefore, cantilevered out from the bottom forward edge of the substrate 20. Because of the nature of the materials employed in such microfabrication, the cantilevered arms 154 deflect easily (i.e. their self biasing force is practically non-existent). Because such microfabricated materials have a very smooth surface, the inherently reflect the laser beam 24, thus forming the desired optical lever. The actual contacting tip 16 is made of diamond and separately attached where the two arms 154 join to form the "V".

Figure 6:
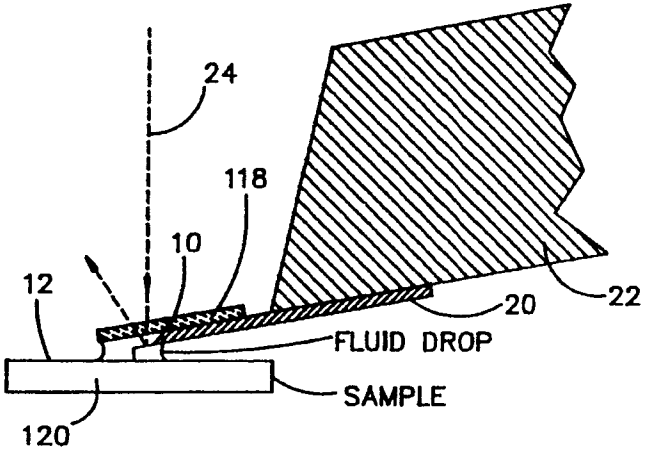
FIG. 6 is an enlarged cutaway side view of the probe and tip of a non-preferred embodiment of the present invention in which the scanning takes place within a fluid drop.

The problems of capillary action and friction in soft samples can be solved in the AFM 28 of this invention by optionally having the probe 10 and area of the sample being scanned immersed in a fluid bath. In a non-preferred embodiment, this novel aspect of the present invention can be accomplished in the manner shown in FIG. 6. This approach was employed in early tested embodiments of the present invention; but, has been superceded by the apparatus to be described shortly. As will be noted, this embodiment employs the prior art technique of having the probe 10 mounted on a substrate 20 which, in turn, is mounted to a steel block 22, or the like, carried by the base portion of the AFM. To provide the fluid bath, a clear cover glass 118 is attached to the top of the substrate 20 extending outward over the probe 10. A drop of fluid 120 (such as de-ionized water) is then injected with a syringe into the area surrounding the probe 10 defined by the cover glass 118, the sample surface 12, and the edge of the substrate 20, where it adheres by capillary action and surface tension. The laser beam 24 passes through the cover glass 118 and fluid 120 to the probe 10 from which it is reflected to pass back through the fluid 120 and cover glass 118. Any minor refraction will remain constant and can be accounted for by adjusting the position of the photoelectric sensor 26. Other than being associated with the non-replaceable, steel block mounted probe 10, the only other problem with this embodiment is that the life of the drop of fluid 120 is limited due to evaporation.

Figure 7:
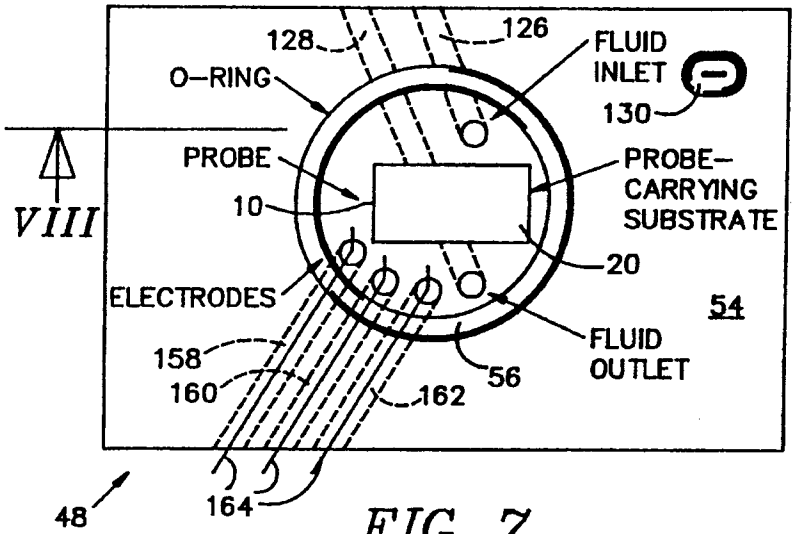
FIG. 7 is a bottom view of the probe-carrying module of the present invention in its preferred embodiment.
Figure 8:
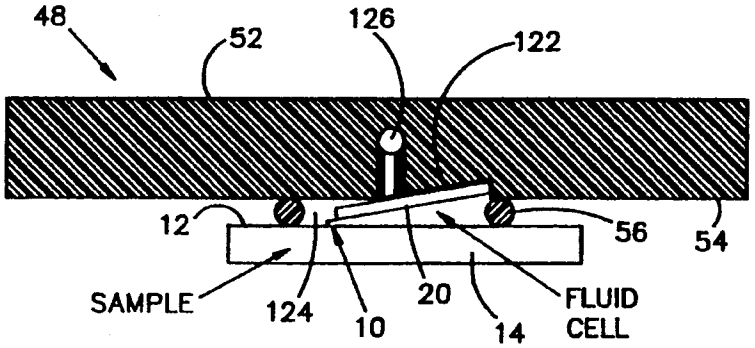
FIG. 8 is a cutaway view of the probe-carrying module of FIG. 7 in the plane VIII—VIII.
Figure 18:
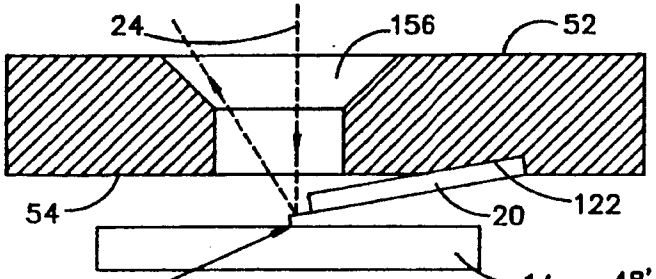
FIG. 18 is a drawing of an optional removeable but non-transparent probe-carrying module without fluid cell potential that may be employed in the present invention.

The probe-carrying module 48 [shwon] *shown* in detail in FIGS. 7 and 8 solves many of the problems associated with the prior art while, when desired or needed, optionally providing the novel fluid cell environment of this invention and is, therefore, the preferred approach. Each probe-carrying module 48 is assembled and calibrated (in the manner to be described shortly) at the factory. As mentioned earlier, if the probe 10 wears out or breaks off, the researcher merely installs a new probe-carrying module 48 and sends the broken one back to the factory for recycling. The probe-carrying module 48 has an angled area 122 (approximately 10°) cut into the bottom surface 54 into which the probe carrying substrate 20 is glued. The probe 10 and substrate 20 are surrounded by an O-ring 56 which is also adhesively attached to the bottom surface 54. When the O-ring 56 is positioned on the surface 12 of the sample 10 as shown in FIG. 8, a fluid cell 124 is formed between the bottom surface 54 and the sample surface 12 within the O-ring 56. Inlet and outlet tubes 126, 128 are formed into the material of the probe-carrying module 48 communicating with the fluid cell 124 and the exterior of the module 48. Fluid 120 can be injected (or even circulated if applicable) through the tubes 126, 128. The evaporation problem is, therefore, eliminated. It should be noted that where the fluid cell is not needed, the optional probe-carrying module 48 of FIG. 18 can be employed. In this case, the probe-carrying module 48' is of metal or plastic and, as with the above-described version, has an angled area 122 (approximately 10°) cut into the bottom surface 54 into which the probe carrying substrate 20 is glued. A bore 156 through the probe-carrying module 48' from the top surface 52 to the bottom surface 54 aligned with the probe 10 is provided to allow the laser beam 24 to pass through the probe-carrying module 48', strike the probe 10, and be reflected therefrom to the photoelectric sensor 26.

Returning to the above-described preferred probe-carrying module 48 containing the fluid cell, in addition to providing the benefits described with respect to eliminating the capillary attraction affect on the probe 10 and the reduction of friction in soft samples, the fluid cell can also be employed for electro-chemical purposes, and the like. To this end, in the preferred embodiment of this invention three additional tubes 158, 160, and 162 are formed into the material of the probe-carrying module 48 communicating with the fluid cell 124 and the exterior of the module 48. Each of the tubes contains an electrode 164 extending between the fluid cell 124 on one end and the exterior of the module 48 on the other, at which point electrical connection can be made thereto. As will readily be appreciated by those skilled in the art, such an arrangement has many uses. For example, samples could be "pinned down" to substrates electrically by applying a voltage between one or more of the electrodes 164 in the fluid cell (containing the sample) and the voltage shield 112. The presence of the three electrodes 164 (i.e. a working electrode, a reference electrode, and an auxiliary electrode) make possible a wide range of electro-chemical studies such as plating, corrosion, and electrostripping within the real-time environment of the AFM 28.

Figure 9:
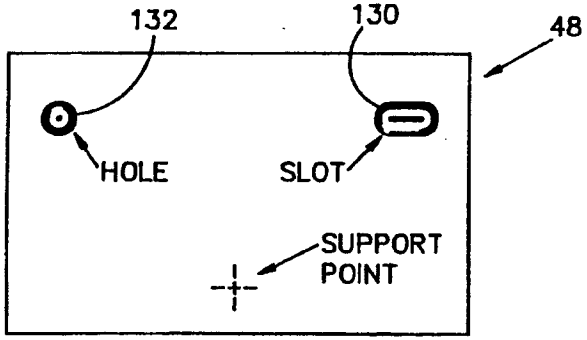
PRIOR ART FIG. 9
FIG. 9 is a simplified drawing depicting a prior art three point support/adjustment technique as employed in the present invention.

The prior art hole/slot/support system employed in the invention and mentioned earlier is depicted in simplified form in FIG. 9. Three points, of course, define a plane as is a well known mathematical fact just as the fact that two points define a straight line. A simpler example is the three legged stool, which will never wobble like its four legged cousin. Thus, in complex apparatus such as the AFM 28 wherein stability of the components therein with respect to one another, the use of a three point support system is a logical approach. To provide accuracy of placement with adjustability, the hole/slot/support technique of FIG. 9 is commonly employed. The surface to be supported has a straight slot 130 formed therein at a first general point of support. A hole 132 is formed into the surface in longitudinal alignment with the slot 130 at a second, but specific, point of support. The surface to be supported is placed on three supports by first placing one support into the slot 130. The one support is then slid within the slot as required and the article rotated as needed to allow a second of the three supports to be inserted into the hole 132. Two points of support have thus been established. As two points define a line, the two support points only allow rotation of the surface to be supported about the support points in the hole 132 and slot 130. The surface to be supported is then lower (i.e. rotated about the line defined by the first two support points) until the surface to be supported is resting on the third of the three supports. This supporting technique will repeatedly result in the same positioning of the surface to be supported on the three supports.

Figure 12:
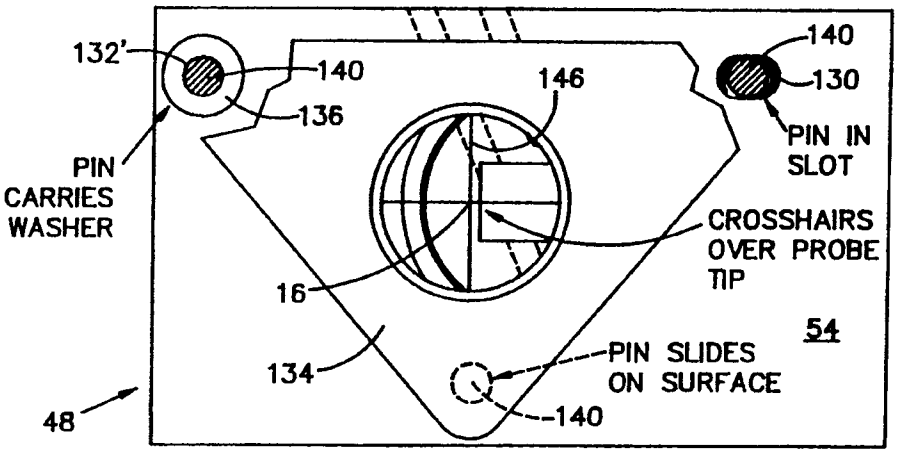
FIG. 12 is a drawing depicting the use of the calibration tool of FIGS. 10 and 11.
Figure 10:
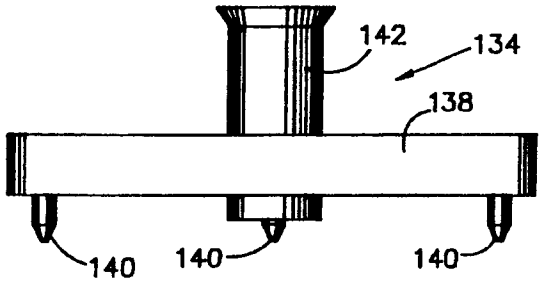
FIG. 10 is a side view of a calibration tool employed in the AFM system of the present invention to make the probe-carrying module position the probe tip exactly in its proper position when the probe-carrying module is inserted into the sample-holding block of FIG. 4.
Figure 11:
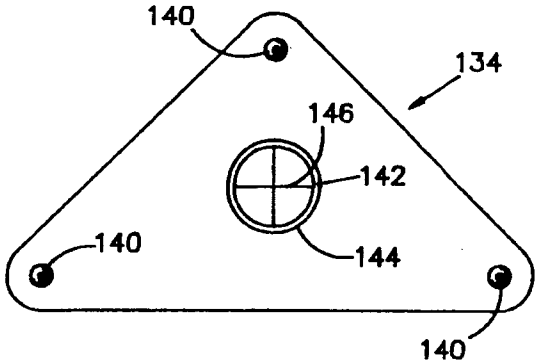
FIG. 11 is a bottom view of the calibration tool of FIG. 10.

While the above-described prior art three point support system is used throughout the AFM 28, a novel approach thereto is used to pre-calibrate the probe-carrying modules 48 at the factory so that when one is inserted into the chamber 46 to be supported by the adjusting screws 50, the probe tip 16 will be placed in approximate accurate alignment with the nominal position of the laser beam 24. As can be seen from the drawing of FIG. 7 the bottom surface 54 of the probe-carrying module 48 has only a slot 130 formed therein. The "hole" 132 is provided according to the calibration technique shown in FIGS. 10–12. At the factory, after the substrate 20 with the probe 10 attached is affixed to the angled area 122, the calibration tool 134 of FIGS. 10 and 11 is employed to position a washer 136 so that the hole in the center of the washer 136 is the hole 132' which receives the second of the adjusting screws 50. The calibration tool 134 has a horizontal base 138 with three pins 140 extending downward therefrom perpendicular to the base 138 and spaced in the same triangular shape as the three adjusting screws 50. A microscope 142 is vertically fit into a bore 144 through the base 138 which has the same relationship to the pins 140 that the bore 64 has to the adjusting screws 50. Crosshairs 146 within the microscope 142 cross in the approximate position of the laser beam 24 within the bore 64. With the probe-carrying module 48 lying on its top surface 52, one pin 140 is inserted in the slot 130. A washer 136 is placed on the bottom surface 54 and another of the pins 140 is inserted into the hole 132' thereof and then placed on the bottom surface 54 along with the third pin 140. The calibration tool 134 is then slid over the bottom surface 54 to place the probe tip 16 in the center of the crosshairs 146. The washer 136 is then glued to the bottom surface 54 by the application of a fast-drying glue thereof such as that sold under the trademark Krazy-Glue. That completes the calibration procedure as the hole 132' is now fixed so as to place the probe tip 16 in the proper position when the probe-carrying module 48 is used in an AFM 28. After insertion of the probe-carrying module 48 into the chamber 46, the micro laser adjustors 76 are then used to precisely place the laser beam 24 on the probe 10 for optimum reflection. Simultaneously, the micro detector adjustor 76 is used to optimally position the photoelectric sensor 26. Thus, the AFM 28 of this invention can be placed into service for useful work quickly and easily without undue expense of time and without the need for a high degree of technical training. If the procedures as set forth above are followed, the probe 10 is virtually unbreakable as a result of the setup procedure; and, when the probe 10 does wear out or break, it is quickly and easily replaced.

Wherefore, having thus described our invention, what is claimed is:

1. An atomic force microscope which is quickly and easily set up and in which the probe thereof is easily replaceable and resists breakage during setup comprising:

(a) a horizontal base member;

(b) a scan tube vertically supported at a bottom end by said base member and having a top surface for holding a sample to be scanned and moveable in x-, y-, and z-directions as a result of scanning voltages applied thereto;

(c) first support means extending upward from said base member;

(d) a sample holding block having a chamber therein, said sample holding block having a first bore communicating with said chamber through a bottom surface, a second bore communicating with said chamber through a top surface, and a third bore communicating with said chamber at an acute angle to said second bore, said sample holding block being positioned with said scan tube passing through said first bore and supported by said first support means;

(e) second support means extending upward from said bottom surface into said chamber;

(f) a probe-carrying module having top and bottom surfaces removably disposed in said chamber and supported by said second support means, said bottom surface having a probe attached thereto and extending downward therefrom at an acute angle with respect to said bottom surface of said probe-carrying module and with a tip of said probe positioned to contact a sample mounted on said top surface of said scan tube;

(g) a source of a laser beam mounted for directing said laser beam down said second bore from said top surface of said sample holding block to pass through said probe-carrying module, strike said probe, and be reflected back through said probe-carrying module and down said third bore to an outer end thereof; and, (h) photoelectric sensor means having an active surface positioned over said outer end of said third bore for developing an electrical signal at an output thereof reflecting the position on said active surface at which said laser beam strikes said active surface.

2. The atomic force microscope of claim 1 wherein: said probe-carrying module is of an optically transparent material whereby said laser beam can pass through said probe-carrying module, strike said probe, and be reflected back through said probe-carrying module.

3. The atomic force microscope of claim 1 wherein: said probe-carrying module is of an optically non-transparent material and has a laser-passing bore therethrough between said top and bottom surfaces aligned so that said laser beam can pas through said laser-passing bore, strike said probe, and be reflected back through said laser-passing bore.

4. The atomic force microscope of claim 1 wherein said probe-carrying module includes an angled pad on said bottom surface thereof and said probe carried by said probe-carrying module comprises;

(a) a substrate attached to said pad; and, (b) and arm of a smooth-surfaced, minimally self-biased material cantilevered outward from a bottom front edge of said substrate to form an optical lever, said arm having a probe point at an outer end thereof.

5. The atomic force microscope of claim 1 wherein: said first support means comprises three first adjusting screws threaded through said base member with said sample holding block resting on top ends thereof with one of said top ends disposed in a slot in a flat bottom surface of said sample holding block, another of said top ends disposed in a hole in said bottom surface, and a third of said top ends disposed on said bottom surface whereby said sample holding block is removable from said base member and repeatably replaceable to a pre-established position thereon.

6. The atomic microscope of claim 1 wherein: said second support means comprises three second adjusting screws threaded through said bottom surface of said sample holding block with said probe-carrying module resting on top ends thereof with one of said top ends disposed in a slot in a flat bottom surface of said probe-carrying module, another of said top ends disposed in a hole in a member affixed to said bottom surface, and a third of said top ends disposed on said bottom surface whereby said probe-carrying module is removable from said chamber of said sample holding block and repeatedly replaceable to a pre-established position therein.

7. The atomic force microscope of claim 1 wherein said probe-carrying module is of an optically transparent material and additionally comprising: sealing means surrounding said probe and attached to said bottom surface of said probe-carrying module for sealing to a top surface of a sample to form a fluid cell around said probe.

8. The atomic force microscope of claim 7 and additionally comprising: an inlet bore and an outlet bore in said probe-carrying module communicating between said fluid cell and the exterior of said probe-carrying module whereby fluid can be inserted into said fluid cell.

9. The atomic force microscope of claim 7 and additionally comprising:

(a) an electrode bore in said probe-carrying module communicating between said fluid cell and the exterior of said probe-carrying module; and, (b) an electrode disposed in said electrode bore having a first end within said fluid cell and a second end at the exterior of said probe-carrying module to which electrical connection can be made.

10. The atomic force microscope of claim 7 and additionally comprising:

(a) three electrode bores in said probe-carrying module communicating between said fluid cell and the exterior of said probe-carrying module; and, (b) a working electrode, a reference electrode, and an auxiliary electrode disposed in said electrode bores, each of said electrodes having a first end within said fluid cell and a second end at the exterior of said probe-carrying module to which electrical connection can be made.

11. The atomic force microscope of claim 1 and additionally comprising:

a voltage shield of an electrically conductive material disposed over said top surface of said scan tube in non-electrical contact therewith, said voltage shield being electrically connected to a fixed voltage source whereby to shield said probe from the effects of said scanning voltages applied to said scan tube.

12. The atomic force microscope of claim 11 wherein: said fixed voltage source is ground.

13. The atomic force microscope of claim 1 and additionally comprising:

a slidably moveable and removeable stage releasably attached to said top surface of said scan tube for releasably and adjustably holding a sample to be scanned attached thereto.

14. The atomci force microscope of claim 13 wherein:

(a) said stage contains a magnet therein; and additionally comprising, (b) a voltage shield of a ferro-magnetic and electrically conductive material disposed over said top surface of said scan tube in non-electrical contact therewith, said voltage shield being electrically connected to a fixed voltage source to shield said probe from the effects of said scanning voltages applied to said scan tube and providing an attachment surface to which said stage can magnetically attach and upon which it can slide.

15. The atomic force microscope of claim 13 wherein:

(a) said stage is of a ferro-magnetic material; and additionally comprising, (b) a voltage shield of an electrically conductive material disposed over said top surface of said scan tube in non-electrical contact therewith, said voltage shield containing a magnet therein, being electrically connected to a fixed voltage source to shield said probe from the effects of said scanning voltages applied to said scan tube, and providing an attachment surface to which said stage can magnetically attach and upon which it can slide.

16. The atomic force microscope of claim 6 and additionally comprising:

first calibration means for positioning said member affixed to said bottom surface of said probe-carrying module as a function of the position of a tip portion of said probe.

17. The atomic force microscope of claim 1 and additionally comprising:

second calibration means for setting the position of said sample holding block on said first support means.

18. The atomic force microscope of claim 1 and additionally comprising:

third calibration means for setting the position of said probe-carrying module on said second support means.

19. An atomic force microscope having extended use capabilities comprising:

(a) a horizontal base member;

(b) a scan tube vertically supported at a bottom end by said base member and having a top surface for holding a sample to be scanned and moveable in x-, y-, and z-directions as a result of scanning voltages applied thereto;

(c) first support means extending upward from said base member;

(d) a sample holding block having a chamber therein, said sample holding block having a first bore communicating with said chamber through a bottom surface, a second bore communicating with said chamber through a top surface, and a third bore communicating with said chamber at an acute angle to said second bore, said sample holding block being positioned with said scan tube passing through said first bore and supported by said first support means;

(e) second support means extending upward from said bottom surface into said chamber;

(f) a probe-carrying module having a probe attached thereto and extending downward therefrom at an acute angle with a tip of said probe positioned to contact a sample mounted on said top surface of said scan tube, said probe carried by said probe-carrying module comprising a substrate attached to said probe-carrying module and an arm of a smooth-surfaced, minimally self-biased material cantilevered outward from a bottom front edge of said substrate to form an optical lever, said arm having a probe point at an outer end thereof;

(g) a source of a laser beam mounted for directing said laser beam down said second bore from said top surface of said sample holding block to strike said probe and be reflected down said third bore to an outer end thereof; and, (h) photoelectric sensor means having an active surface positioned over said outer end of said third bore for developing an electrical signal at an output thereof reflecting the position on said active surface at which said laser beam strikes said active surface.

20. The atomic force microscope of claim 19 wherein: said probe-carrying module has top and bottom surfaces and is removably disposed in said chambeer and supported by said second support means, said bottom surface having said probe attached thereto and extending downward therefrom at an acute angle with respect to said bottom surface of said probe-carrying module and with said tip of said probe positioned to contact a sample mounted on said top surface of said scan tube whereby said laser beam passes through said probe-carrying module, strikes said probe, and is reflected back through said probe-carrying module and down said third bore to said outer end thereof.

21. The atomic force microscope of claim 20 wherein: said probe-carrying module is an optically transparent material whereby said laser beam can pass through said probe-carrying module, strike said probe, and be reflected back through said probe-carrying module.

22. The atomic force microscope of claim 20 wherein:

said probe-carrying module is of an optically non-transparent material and has a laser-passing bore therethrough between said top and bottom surfaces aligned so that said laser beam can pass through said laser-passing bore, strike said probe, and be reflected back through said laser-passing bore.

23. The atomic force microscope of claim 19 wherein: said first support means comprises three first adjusting screws threaded through said base member with said sample holding block resting on top ends thereof with one of said top ends disposed in a slot in a flat bottom surface of said sample holding block, another of said top ends disposed in a hole in said bottom surface, and a third of said top ends disposed on said bottom surface whereby said sample holding block is removable from said base member and repeatedly replaceable to a pre-established position thereon.

24. The atomic force microscope of claim 19 wherein: said second support means comprises three second adjusting screws threaded through said bottom surface of said sample holding block with said probe-carrying module resting on top ends thereof with one of said top ends disposed in a slot in a flat bottom surface of said probe-carrying module, another of said top ends disposed in a hole in a member affixed to said bottom surface, and a third of said top ends disposed on said bottom surface whereby said probe-carrying module is removable from said chamber of said sample holding block and repeatedly replaceable to a pre-established position therein.

25. The atomic force microscope of claim 19 and additionally comprising:

means for forming a fluid cell around said probe.

26. The atomic force microscope of claim 25 wherein said means for forming a fluid cell around said probe comprises:

a cover plate of an optically transparent material disposed over said probe whereby a drop of fluid can be held between said cover plate and a top surface of a sample by capillary action whereby said laser beam can pass through said cover plate, strike said probe, and be reflected back through said cover plate.

27. The atomic force microscope of claim 25 wherein said probe-carrying module is of an optically transparent material and said means for forming a fluid cell around said probe comprises:

sealing means surrounding said probe and attached to said bottom surface of said probe-carrying module for sealing to a top surface of a sample to form a fluid cell around said probe.

28. The atomic force microscope of claim 27 and additionally comprising:

an inlet bore and an outlet bore in said probe-carrying module communicating between said fluid cell and the exterior of said probe-carrying module whereby fluid can be inserted into said fluid cell.

29. The atomic force microscope of claim 27 and additionally comprising:

(a) an electrode bore in said probe-carrying module communicating between said fluid cell and the exterior of said probe-carrying module; and, (b) an electrode disposed in said electrode bore having a first end within said fluid cell and a second end at the exterior of said probe-carrying module to which electrical connection can be made.

30. The atomic force microscope of claim 27 and additionally comprising:

(a) three electrode bores in said probe-carrying module communicating between said fluid cell and the exterior of said probe-carrying module; and, (b) a working electrode, a reference electrode, and an auxiliary electrode disposed in said electrode bores, each of said electrodes having a first end within said fluid cell and a second end at the exterior of said probe-carrying module to which electrical connection can be made.

31. The atomic force microscope of claim 19 and additionally comprising:

a voltage shield of an electrically conductive material disposed over said top surface of said scan tube in non-electrical contact therewith, said voltage shield being electrically connected to a fixed voltage source whereby to shield said probe from the effects of said scanning voltages applied to said scan tube.

32. The atomic force microscope of claim 31 wherein: said fixed voltage source is ground.

33. The atomic force microscope of claim 19 and additionally comprising:

a slidably moveable and removable stage releasably attached to said top surface of said scan tube for releasably and adjustably holding a sample to be scanned attached thereto.

34. The atomic force microcscope of claim 33 wherein:

(a) said stage contains a magnet therein; and additionally comprising, (b) a voltage shield of a ferro-magnetic and electrically conductive material disposed over said top surface of said scan tube in non-electrical contact therewith, said voltage shield being electrically connected to a fixed voltage source to shield said probe from the effects of said scanning voltages applied to said scan tube and providing an attachment surface to which said stage can magnetically attach and upon which it can slide.

35. The atomic force microscope of claim 33 wherein:

(a) said stage is of a ferro-magnetic material; and additionally comprising, (b) a voltage shield of an electrically conductive material disposed over said top surface of said scan tube in non-electrical contact therewith, said voltage shield containing a magnet therein, being electrically connected to a fixed voltage source to shield said probe from the effects of said scanning voltages applied to said scan tube, and providing an attachment surface to which said stage can magnetically attach and upon which it can slide.

36. The atomic force microscope of claim 24 and additionally comprising:

first calibration means for positioning said member affixed to said bottom surface of said probe-carrying module as a function of the position of a tip position of said probe.

37. The atomic force microscope of claim 19 and additionally comprising:

second calibration means for setting the position of said sample holding block on said first support means.

38. The atomic force microscope of claim 19 and additionally comprising:

third calibration means for setting the position of said probe-carrying module on said second support means.

39. An atomic force microscope containing an easily replaceable probe-carrying member including an optional fluid cell comprising:

(a) a horizontal base member;

(b) a scan tube vertically supported at a bottom end by said base member and having a top surface for holding a sample to be scanned and moveable in x-, y-, and z-directions as a result of scanning voltages applied thereto;

(c) first support means extending upward from said base member;

(d) a sample holding block having a chamber therein, said sample holding block having a first bore communicating with said chamber through a bottom surface, a second bore communicating with said chamber through a top surface, and a third bore communicating with said chamber at an acute angle to said second bore, said sample holding block being positioned with said scan tube passing through said first bore and supported by said first support means;

(e) second support means extending upward from said bottom surface into said chamber;

(f) a probe-carrying module of an optically transparent material having top and bottom surfaces removably disposed in said chamber and supported by said second support means, said bottom surface having a probe attached thereto and extending downward therefrom at an acute angle with respect to said bottom surface of said probe-carrying module and with a tip of said probe positioned to contact a sample mounted on said top surface of said scan tube, said probe-carrying module including an angled pad on said bottom surface thereof and said probe carried by said probe-carrying module comprising, (f1) a substrate attached to said pad, and (f2) an arm of a smooth-surfaced, minimally self-biased material cantilevered outward from a bottom front edge of said substrate to form an optical lever, said arm having a probe point at an outer end thereof;

(g) sealing means surrounding said probe and attached to said bottom surface of said probe-carrying module for sealing to a top surface of a sample to form a fluid cell around said probe;

(h) a source of a laser beam mounted for directing said laser beam down said second bore from said top surface of said sample holding block to pass through said probe-carrying module, strike said probe, and be reflected back through said probe-carrying module and down said third bore to an outer end thereof; and, (i) photoelectric sensor means having an active surface positioned over said outer end of said third bore for developing an electrical signal at an output thereof reflecting the position of said active surface at which said laser beam strikes said active surface.

40. The atomic force microscope of claim 39 wherein: said first support means comprises three first adjusting screws threaded through said base member with said sample holding block resting on top ends thereof with one of said top ends disposed in a slot in a flat bottom surface of said sample holding block, another of said top ends disposed in a hole in said bottom surface, and a third of said top ends disposed on said bottom surface whereby said sample holding block is removable from said base member and repeatedly replaceable to a pre-established position thereon.

41. The atomic force microscope of claim 39 wherein: said second support means comprises three second adjusting screws threaded through said bottom surface of said sample holding block with said probe-carrying module resting on top ends thereof with one of said top ends disposed in a slot in a flat bottom surface of said probe-carrying module, another of said top ends disposed in a hole in a member affixed to said bottom surface, and a third of said top ends disposed on said bottom surface whereby said probe-carrying module is removable from said chamber of said sample holding block and repeatably replaceable to a pre-established position therein.

42. The atomic force microscope of claim 39 and additionally comprising:

an inlet bore and an outlet bore in said probe-carrying module communicating between said fluid cell and the exterior of said probe-carrying module whereby fluid can be inserted into said fluid cell.

43. The atomic force microscope of claim 39 and additionally comprising:

(a) an electrode bore in said probe-carrying module communicating between said fluid cell and the exterior of said probe-carrying module; and, (b) an electrode disposed in said electrode bore having a first end within said fluid cell and a second end at the exterior of said probe-carrying module to which electrical connection can be made.

44. The atomic force microscope of claim 39 and additionally comprising:

(a) three electrode bores in said probe-carrying module communicating between said fluid cell and the exterior of said probe-carrying module; and, (b) a working electrode, a reference electrode, and an auxiliary electrode disposed in said electrode bores, each of said electrodes having a first end within said fluid cell and a second end at the exterior of said probe-carrying module to which electrical connection can be made.

45. The atomic force microscope of claim 39 and additionally comprising:

a voltage shield of an electrically conductive material disposed over said top surface of said scan tube in non-electrical contact therewith, said voltage shield being electrically connected to a fixed voltage source whereby to shield said probe from the effects of said scanning voltages applied to said scan tube.

46. The atomic force microscope of claim 39 and additionally comprising:

a slidably moveable and removable stage releasably attached to said top surface of said scan tube for releasably and adjustably holding a sample to be scanned attached thereto.

47. The atomic force microscope of claim 46 wherein:

(a) said stage contains a magnet therein; and additionally comprising, (b) a voltage shield of a ferro-magnetic and electrically conductive material disposed over said top surface of said scan tube in non-electrical contact therewith, said voltage shield being electrically connected to a fixed voltage source to shield said probe from the effects of said scanning voltages applied to said scan tube and providing an attachment surface to which said stage can magnetically attach and upon which it can slide.

48. The atomic force microscope of claim 46 wherein:

(a) said stage is of a ferro-magnetic material; and additionally comprising, (b) a voltage shield of an electrically conductive material disposed over said top surface of said scan tube in non-electrical contact therewith, said voltage shield containing a magnet therein, being electrically connected to a fixed voltage source to shield said probe from the effects of said scanning voltages applied to said scan tube, and providing an attachment surface to which said stage can magnetically attach and upon which it can slide.

49. An atomic force microscope including an fluid cell surrounding a scanning probe for preventing damage to a scanned sample and the scanning probe comprising:

(a) a horizontal base member;

(b) a scan tube vertically supported at a bottom end by said base member and having a top surface for holding a sample to be scanned and moveable in x-, y-, and z-directions as a result of scanning voltages applied thereto;

(c) a probe-carrying module disposed above said top surface of said scan tube and having a probe attached thereto and extending downward therefrom with a tip of said probe positioned to contact a sample mounted on said top surface of said scan tube;

(d) means for sensing movement of said probe and for providing an electrical signal at an output thereof reflecting said movement of said probe; and, (e) fluid cell forming means carried by said probe-carrying module for forming a fluid cell around said probe on a top surface of a sample mounted on said top surface of said scan tube when filled with a fluid.

50. The atomic force microscope of claim 49 wherein:

said fluid cell forming means comprises a cover glass disposed over said probe and close enough to said top surface of said sample to maintain a drop of fluid between said top cover glass and said surface of said sample around said probe by capillary action.

51. The atomic force microscope of claim 49 wherein:

said fluid cell forming means comprises annular sealing means surrounding said probe and attached to a bottom surface of said probe-carrying module for sealing to said top surface of said sample to form a fluid cell around said probe.

52. The atomic force microscope of claim 51 and additionally comprising:

an inlet bore and an outlet bore in said probe-carrying module communicating between said fluid cell and the exterior of said probe-carrying module whereby fluid can be inserted into said fluid cell.

53. The atomic force microscope of claim 51 and additionally comprising:

(a) an electrode bore in said probe-carrying module communicating between said fluid cell and the exterior of said probe-carrying module; and, (b) an electrode disposed in said electrode bore having a first end within said fluid cell and a second end at the exterior of said probe-carrying module to which electrical connection can be made.

54. The atomic force microscope of claim 51 and additionally comprising:

(a) three electrode bores in said probe-carrying module communicating between said fluid cell and the exterior of said probe-carrying module; and, (b) a working electrode, a reference electrode, and an auxiliary electrode disposed in said electrode bores, each of said electrodes having a first end within said fluid cell and a second end at the exterior of said probe-carrying module to which electrical connection can be made.

55. The atomic force microscope of claim 51 and additionally comprising:

a voltage shield of an electrically conductive material disposed over said top surface of said scan tube in non-electrical contact therewith, said voltage shield being electrically connected to a fixed voltage source whereby to shield said probe from the effects of said scanning voltages applied to said scan tube.

56. The atomic force microscope of claim 51 and additionally comprising:

a slidably moveable and removable stage releasably attached to said top surface of said scan tube for releasably and adjustably holding a sample to be scanned attached thereto.

57. The atomic force microscope of claim 56 wherein:

(a) said stage contains a magnet therein; and additionally comprising:

(b) a voltage shield of a ferro-magnetic and electrically conductive material disposed over said top surface of said scan tube in non-electrical contact therewith, said voltage shield being electrically connected to a fixed voltage source to shield said probe from the effects of said scanning voltages applied to said scan tube and providing an attachment surface to which said stage can magnetically attach and upon which it can slide.

58. The atomic force microscope of claim 56 wherein:

(a) said stage is of a ferro-magnetic material; and additionally comprising, (b) a voltage shield of an electrically conductive material disposed over said top surface of said scan tube in non-electrical contact therewith, said voltage shield containing a magnet therein, being electrically connected to a fixed voltage source to shield said probe from the effects of said scanning voltages applied to said scan tube, and providing an attachment surface to which said stage can magnetically attach and upon which it can slide.

*59. An atomic force microscope for determining a characteristic of a sample, comprising:*

*a probe adapted to scan said sample;*

*scanning means for causing relative scanning movement between said probe and said sample;*

*sensing means for sensing a position of said probe; and*

*a non-cryogenic fluid body in communication with said sample and in which said probe is immersed in contact with said sample so that during said relative scanning movement capillary attraction between said probe and said sample, caused by a surface film formed on said sample due to exposure to ambient atmosphere, is reduced.*

*60. The atomic force microscope according to claim 59, further comprising:*

*a rigid cover plate disposed on a top surface of said fluid body to define a fluid cell between said cover plate and said sample.*

*61. The atomic force microscope according to claim 60, wherein:*

*said rigid cover plate comprises an optically transparent material; and*

*said sensing means comprises optical means for sensing a vertical movement of said probe by means of light applied to said probe through said rigid cover plate.*

*62. The atomic force microscope according to claim 59, comprising:*

*means for exchanging fluid within said fluid body.*

*63. The atomic force microscope according to claim 59, further comprising:*

*two or more electrodes in contact with said fluid body for performing an electrochemical reaction.*

*64. The atomic force microscope according to claim 60, further comprising;*

*two or more electrodes in contact with said fluid body for performing an electrochemical reaction.*

*65. The atomic force microscope according to claim 61, further comprising;*

*two or more electrodes in contact with said fluid body for performing an electrochemical reaction.*

*66. The atomic force microscope according to claim 62, further comprising;*

*two or more electrodes in contact with said fluid body for performing an electrochemical reaction.*

*67. The atomic force microscope according to claim 59, wherein said scanning means comprises:*

*a scanner; and*

*a conductive shield element at a fixed potential disposed between said probe and said scanner for electrically shielding said probe from said scanner.*

*68. The atomic force microscope according to claim 60, wherein said scanning means comprises:*

*a scanner; and*

*a conductive shield element at a fixed potential disposed between said probe and said scanner for electrically shielding said probe from said scanner.*

*69. The atomic force microscope according to claim 61, wherein said scanning means comprises:*

*a scanner; and*

*a conductive shield element at a fixed potential disposed between said probe and said scanner for electrically shielding said probe from said scanner.*

*70. The atomic force microscope according to claim 62, wherein said scanning means comprises:*

*a scanner; and*

*a conductive shield element at a fixed potential disposed between said probe and said scanner for electrically shielding said probe from said scanner.*

*71. The atomic force microscope according to claim 63, wherein said scanning means comprises:*

*a scanner; and*

*a conductive shield element at a fixed potential disposed between said probe and said scanner for electrically shielding said probe from said scanner.*

*72. The atomic force microscope according to claim 64, wherein said scanning means comprises:*

*a scanner; and*

*a conductive shield element at a fixed potential disposed between said probe and said scanner for electrically shielding said probe from said scanner.*

*73. The atomic force microscope according to claim 65, wherein said scanning means comprises:*

*a scanner; and*

*a conductive shield element at a fixed potential disposed between said probe and said scanner for electrically shielding said probe from said scanner.*

*74. The atomic force microscope according to claim 66, wherein said scanning means comprises:*

*a scanner; and*

*a conductive shield element at a fixed potential disposed between said probe and said scanner for electrically shielding said probe from said scanner.*

*75. The atomic force microscope according to claim 59, further comprising:*

*a removable probe module on which said probe is fixedly mounted at a selected location.*

*76. The atomic force microscope according to claim 75, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*77. The atomic force microscope according to claim 61, further comprising:*

*a removable probe module on which said probe is fixedly mounted at a selected location.*

*78. The atomic force microscope according to claim 77, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*79. The atomic force microscope according to claim 62, further comprising:*

*a removable probe module on which said probe is fixedly mounted at a selected location.*

*80. The atomic force microscope according to claim 79, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*81. The atomic force microscope according to claim 63, further comprising:*

*a removable probe module on which said probe is fixedly mounted at a selected location.*

*82. The atomic force microscope according to claim 81, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*83. The atomic force microscope according to claim 65, further comprising:*

*a removable problem module on which said probe is fixedly mounted at a selected location.*

*84. The atomic force microscope according to claim 83, further comprising:*

*a probe module support mechanically coupled to said probe module during operation of said atomic force microscope and having a predetermined spatial arrangement with said sensing means so that when said*

*probe module is mechanically coupled to said probe module support, said probe is in substantial alignment with said sensing means.*

*85. The atomic force microscope according to claim 66, further comprising:*

*a removable probe module on which said probe is fixedly mounted at a selected location.*

*86. The atomic force microscope according to claim 85, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*87. The atomic force microscope according to claim 67, further comprising:*

*a removable probe module on which said probe is fixedly mounted at a selected location.*

*88. The atomic force microscope according to claim 87, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*89. The atomic force microscope according to claim 69, further comprising:*

*a removable probe module on which said probe is fixedly mounted at a selected location.*

*90. The atomic force microscope according to claim 89, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*91. The atomic force microscope according to claim 70, further comprising:*

*a removable probe module on which said probe is fixedly mounted at a selected location.*

*92. The atomic force microscope according to claim 91, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*93. The atomic force microscope according to claim 71, further comprising:*

*a removable probe module on which said probe is fixedly mounted at a selected location.*

*94. The atomic force microscope according to claim 93, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*95. The atomic force microscope according to claim 72, further comprising:*

*a removable probe module on which said probe is fixedly mounted at a selected location.*

*96. The atomic force microscope according to claim 95, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*97. The atomic force microscope according to claim 73, further comprising:*

*a removable probe module on which said probe is fixedly mounted at a selected location.*

*98. The atomic force microscope according to claim 97, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*99. The atomic force microscope according to claim 74, further comprising:*

*a removable probe module on which said probe is fixedly mounted at a selected location.*

*100. The atomic force microscope according to claim 99, further comprising:*

*a probe module support mechanically coupled to said probe module during operation of said atomic force microscope and having a predetermined spatial arrangement with said sensing means so that when said probe module is mechanically coupled to said probe module support, said probe is in substantial alignment with said sensing means.*

*101. The atomic force microscope according to claim 59, further comprising:*

*a slidably moveable and removable sample support releasably coupled to said scanning means and on which said sample is mounted.*

*102. The atomic force microscope according to claim 101, further comprising:*

*magnetic means for magnetically mechanically coupling said sample support to said scanning means.*

*103. The atomic force microscope according to claim 60, further comprising:*

*a slidably moveable and removable sample support releasably coupled to said scanning means and on which said sample is mounted.*

*104. The atomic force microscope according to claim 103, further comprising:*

*magnetic means for magnetically mechanically coupling said sample support to said scanning means.*

*105. The atomic force microscope according to claim 63, further comprising:*

*a slidably moveable and removable sample support releasably coupled to said scanning means and on which said sample is mounted.*

*106. The atomic force microscope according to claim 105, further comprising:*

*magnetic means for magnetically mechanically coupling said sample support to said scanning means.*

*107. The atomic force microscope according to claim 67, further comprising:*

*a slidably moveable and removable sample support releasably coupled to said scanning means and on which said sample is mounted.*

*108. The atomic force microscope according to claim 107, further comprising:*

*magnetic means for magnetically mechanically coupling said sample support to said scanning means.*

*109. The atomic force microscope according to claim 76, further comprising:*

*a slidably moveable and removable sample support releasably coupled to said scanning means and on which said sample is mounted.*

*110. The atomic force microscope according to claim 109, further comprising:*

*magnetic means for magnetically mechanically coupling said sample support to said scanning means.*

*111. The atomic force microscope according to claim 87, further comprising:*

*a slidably moveable and removable sample support releasably coupled to said scanning means and on which said sample is mounted.*

*112. The atomic force microscope according to claim 111, further comprising:*

*magnetic means for magnetically mechanically coupling said sample support to said scanning means.*

*113. The atomic force microscope according to claim 59, comprising:*

*a support on which said sensing means is mounted; and*

*means mounted on said support for adjusting positioning of said sensing means.*

*114. The atomic force microscope according to claim 113, comprising:*

*said sensing means comprising a light beam source and a light beam detector; and*

*said adjusting means comprising means for adjusting positioning of at least one of said light beam source and said light beam detector so that a light beam output by said source and reflected of said probe is incident on said detector.*

*115. The atomic force microscope according to claim 60, comprising:*

*a support on which said sensing means is mounted; and*

*means mounted on said support for adjusting positioning of said sensing means.*

*116. The atomic force microscope according to claim 115, comprising:*

*said sensing means comprising a light beam source and a light beam detector; and*

*said adjusting means comprising means for adjusting positioning of at least one of said light beam source and said light beam detector so that a light beam output by said source and reflected of said probe is incident on said detector.*

*117. The atomic force microscope according to claim 63, comprising:*

*a support on which said sensing means is mounted; and*

*means mounted on said support for adjusting positioning of said sensing means.*

*118. The atomic force microscope according to claim 117, comprising:*

*said sensing means comprising a light beam source and a light beam detector; and*

*said adjusting means comprising means for adjusting positioning of at least one of said light beam source and said light beam detector so that a light beam output by said source and reflected of said probe is incident on said detector.*

*119. The atomic force microscope according to claim 67, comprising:*

*a support on which said sensing means is mounted; and*

*means mounted on said support for adjusting positioning of said sensing means.*

*120. The atomic force microscope according to claim 119, comprising:*

*said sensing means comprising a light beam source and a light beam detector; and*

*said adjusting means comprising means for adjusting positioning of at least one of said light beam source and said light beam detector so that a light beam output by said source and reflected of said probe is incident on said detector.*

*121. The atomic force microscope according to claim 76, comprising:*

*a support on which said sensing means is mounted; and*

*means mounted on said support for adjusting positioning of said sensing means.*

*122. The atomic force microscope according to claim 121, comprising:*

*said sensing means comprising a light beam source and a light beam detector; and*

*said adjusting means comprising means for adjusting positioning of at least one of said light beam source and said light beam detector so that a light beam output by said source and reflected of said probe is incident on said detector.*

*123. The atomic force microscope according to claim 87, comprising:*

*a support on which said sensing means is mounted; and*

*means mounted on said support for adjusting positioning of said sensing means.*

*124. The atomic force microscope according to claim 123, comprising:*

*said sensing means comprising a light beam source and a light beam detector; and*

*said adjusting means comprising means for adjusting positioning of at least one of said light beam source and said light beam detector so that a light beam output by said source and reflected of said probe is incident on said detector.*

*125. The atomic force microscope according to claim 106, comprising:*

*a support on which said sensing means is mounted; and*

*means mounted on said support for adjusting positioning of said sensing means.*

*126. The atomic force microscope according to claim 125, comprising:*

*said sensing means comprising a light beam source and a light beam detector; and*

*said adjusting means comprising means for adjusting positioning of at least one of said light beam source and said light beam detector so that a light beam output by said source and reflected of said probe is incident on said detector.*

*127. In an atomic force microscope having a deflection detection system for detecting a deflection of a lever mounted probe as said probe is scanned across a surface of a sample by a means for scanning the sample, the improvement comprising:*

*a non-cryogenic fluid body in communication with said surface of the sample and in which said probe is immersed in contact with said sample while said probe is scanned across the surface of the sample.*

*128. The atomic force microscope according to claim 127, further comprising:*

*a rigid cover plate disposed on a top surface of said fluid body to define a fluid cell between said cover plate and said sample.*

*129. The atomic force microscope according to claim 128, wherein:*

*said rigid cover plate comprises an optically transparent material; and*

*said deflection detection system comprises optical means for sensing a vertical movement of said probe by means of light applied to said probe through said rigid cover plate.*

*130. The atomic force microscope according to claim 127, further comprising:*

*two or more electrodes in contact with said fluid body for performing an electrochemical reaction.*

*131. In an atomic force microscope having a deflection detection system for detecting a deflection of a lever mounted probe as said probe is scanned across a surface of a sample, the improvement comprising:*

*a scanner for scanning said probe; and*

*a conductive shield at a fixed potential disposed between said probe and said scanner.*

*132. The atomic force microscope according to claim 131, wherein said scanner comprises a piezoelectric tube and said conductive shield is mounted on a distal end of said tube between said tube and said probe.*

*133. In a method of operating an atomic force microscope in which a lever mounted probe is scanned across the surface of a sample by a scanner and a deflection of said lever mounted probe is detected by a deflection detection system, the improvement comprising:*

*providing a fluid body in communication with the surface of the sample and not in communication with said scanner;*

*immersing said lever mounted probe in said fluid body; and*

*scanning said lever mounted probe across the suface of the sample while said lever mounted probe is immersed in said fluid body.*

*134. The method according to claim 133, comprising:*

*placing two or more electrodes in contact with said fluid body; and*

*applying a voltage across said electrodes during said scanning step to produce an electrochemical reaction in said fluid.*

*135. In an atomic force microscope having a deflection detection system for detecting a deflection of a lever mounted probe as said probe is scanned across a surface of a sample, the improvement comprising:*

*a removable probe module on which said probe fixedly mounted at a selected location; and*

*a probe module support mechanically coupled to said probe module during operation of said atomic force microscope and having a predetermined spatial arrangement with said deflection detection system so that when said probe module is mechanically coupled to said probe module support, said probe is in substantial alignment with said deflection detection system.*

*136. In an atomic force microscope having a deflection detection system for detecting a deflection of a lever mounted probe as said probe is scanned across a surface of a sample by a means for scanning the sample, the improvement comprising:*

*a slidably moveable and removable sample support releasably coupled to said scanning means and on which said sample is mounted.*

*137. The atomic force microscope according to claim 136, further comprising:*

*magnetic means for magnetically mechanically coupling said sample support to said scanning means.*

*138. In an atomic force microscope having a deflection detection ssystem for detecting deflection of a lever mounted probe as said probe is scanned by a scanner across a surface of a sample, the improvement comprising:*

*a support on which said deflection detection system and said probe are mounted; and*

*means mounted on said support for adjusting positioning of said deflection detection system.*

*139. The atomic force microscope according to claim 138, further comprising:*

*said deflection detection system comprising a light beam source and a light beam detector; and*

*said adjusting means comprising means for adjusting positioning of at least one of said light beam source and said light beam detector so that a light beam output by said source and reflected off said probe is incident on said detector.*

* * * * *

UNITED STATES PATENT AND TRADEMARK OFFICE

CERTIFICATE OF CORRECTION

PATENT NO. : Re. 34,489
DATED : DECEMBER 28, 1993
INVENTOR(S) : HANSMA ET AL.

It is certified that error appears in the above-indentified patent and that said Letters Patent is hereby corrected as shown below:

Column 10, line 42, change "the" to --they--.

Column 14, line 10, change "pas" to --pass--.

Column 15, line 31, change "atomci" to --atomic--.

Column 16, line 50, change "chambeer" to --chamber--.

Column 21, line 17, change "an" to --a--.

Column 24, line 61, change "problem" to --probe--.

Column 30, line 8, after "probe" insert --is--.

Signed and Sealed this

Twentieth Day of June, 1995

*Attest:*

Bruce Lehman

BRUCE LEHMAN

*Attesting Officer*

*Commissioner of Patents and Trademarks*

US001034489B1

REEXAMINATION CERTIFICATE (3952nd)

United States Patent [19] [11] B1 Re. 34,489

Hansma et al. [45] Certificate Issued Dec. 14, 1999

[54] ATOMIC FORCE MICROSCOPE WITH OPTIMAL REPLACEMENT FLUID CELL

[75] Inventors: Paul K. Hansma; Barney Drake, both of Santa Barbara, Calif.

[73] Assignee: Regents of the University of California, Oakland, Calif.

Reexamination Request:
No. 90/005,003, Jun. 1, 1998

Reexamination Certificate for:

| | |
|---|---|
| Patent No.: | **Re. 34,489** |
| Issued: | **Dec. 28, 1993** |
| Appl. No.: | **07/895,984** |
| Filed: | **Jun. 4, 1992** |

Certificate of Correction issued Jun. 21, 1995.

Related U.S. Patent Documents

Reissue of:

| | | |
|---|---|---|
| [64] | Patent No.: | **4,935,634** |
| | Issued: | **Jun. 19, 1990** |
| | Appl. No.: | **07/322,001** |
| | Filed: | **Mar. 13, 1989** |

[51] Int. Cl.[6] ..... G01N 21/86

[52] U.S. Cl. ..... 250/559.23; 250/306

[58] Field of Search ..... 250/559.23, 559.4, 250/216, 306, 307, 423 F

[56] References Cited

PUBLICATIONS

Marti et al., Atomic Force Microscopy of an Organic Monolayer American Association for the Advancement of Science vol. 239, Jan. 1, 1988, pp. 50–52.

Erlandsson et al., Atomic Force Microscopy Using Optical Interferometry, J. Vac. Sci. Technol. A. Vol. 6, No. 2, Mar./Apr. 1988, pp. 266–270.

Erlandsson et al., Atomic Scale Friction Between the Muscovite Mica Cleavage Plane and a Tungsten Tip, J. Chem. Phys. vol. 89, No. 8, pp. 5190–5193, Oct. 15, 1988.

*Primary Examiner*—Stephone B. Allen

[57] ABSTRACT

An atomic force microscope which is readily useable for researchers for its intended use without extensive lost time for setup and repair. The probe used therein is a cantilevered optical lever which imparts surface information in a gentle and reliable manner by reflecting an incident laser beam. The probe is carried by a replaceable probe-carrying module which is factory set up and merely inserted and fine tuned by the user. The probe-carrying moduel also includes the provision for forming a fluid cell around the probe. Fluid can be inserted into and/or be circulated through the fluid cell through incorporated tubes in the porbe-carrying module. Electrodes are also provided in the fluid cell for various uses including real-time studies of electro-chemical operations taking place in the fluid cell. The piezoelectric scan tube employed includes a voltage shield to prevent scanning voltages to the tube from affecting data readings. Samples are easily mounted, replaced, and horizontally adjusted using a sample stage which is magnetically attached to the top of the scan tube. Calibration tools are provided to make initial set up and fine tuning of the microscope a simple and straightforward operation requiring little or no techincal talent.

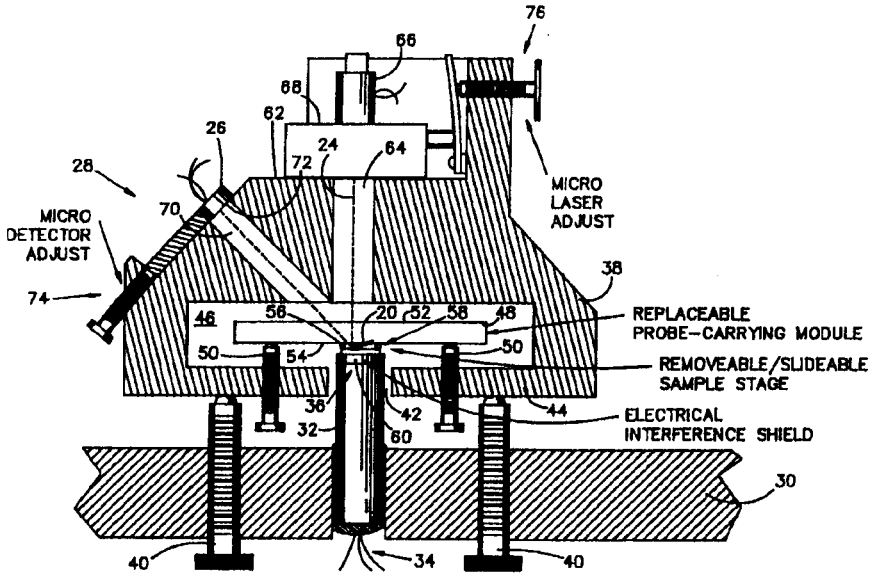

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–139 is confirmed.

* * * * *